United States Patent
Ramaswamy

(10) Patent No.: US 10,263,274 B2
(45) Date of Patent: Apr. 16, 2019

(54) FUEL CELL MANIFOLD INCLUDING A COATING TO REDUCE THE POSSIBILITY OF AN ELECTRICAL SHORT

(71) Applicant: AUDI AG, Ingolstadt (DE)

(72) Inventor: Sitaram Ramaswamy, West Hartford, CT (US)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/126,953

(22) PCT Filed: Mar. 20, 2014

(86) PCT No.: PCT/US2014/031273
§ 371 (c)(1),
(2) Date: Sep. 16, 2016

(87) PCT Pub. No.: WO2015/142332
PCT Pub. Date: Sep. 24, 2015

(65) Prior Publication Data
US 2017/0098853 A1    Apr. 6, 2017

(51) Int. Cl.
*H01M 8/2485*    (2016.01)
*H01M 8/086*    (2016.01)
*H01M 8/04082*    (2016.01)
*H01M 8/2484*    (2016.01)

(52) U.S. Cl.
CPC ..... *H01M 8/2484* (2016.02); *H01M 8/04201* (2013.01); *H01M 8/086* (2013.01)

(58) Field of Classification Search
CPC ............... H01M 8/2484; H01M 8/086; H01M 8/04201
See application file for complete search history.

(56) References Cited

U.S. PATENT DOCUMENTS

| | | | |
|---|---|---|---|
| 3,050,833 A | | 8/1962 | Schwing |
| 4,623,596 A | * | 11/1986 | Kamoshita .......... H01M 8/2485 429/437 |
| 4,781,727 A | | 11/1988 | Mitsuda et al. |

FOREIGN PATENT DOCUMENTS

| | | |
|---|---|---|
| JP | 7-326374 A | 12/1995 |
| JP | 9-161826 A | 1/1997 |
| KR | 10-2006-0003464 A | 1/2006 |
| KR | 10-0668199 A | 1/2007 |

* cited by examiner

*Primary Examiner* — Ladan Mohaddes
(74) *Attorney, Agent, or Firm* — Seed IP Law Group

(57) ABSTRACT

An illustrative example fuel cell manifold includes a manifold structure having at least one surface situated where the surface may be exposed to phosphoric acid. The surface has a coating that reduces a possibility of an electrical short between the manifold and the fuel cell stack adjacent the manifold if that surface is exposed to phosphoric acid during fuel cell operation.

19 Claims, 1 Drawing Sheet

FUEL CELL MANIFOLD INCLUDING A COATING TO REDUCE THE POSSIBILITY OF AN ELECTRICAL SHORT

TECHNICAL FIELD

The subject matter of this document pertains to fuel cells. More particularly, and without limitation, the subject matter of this document pertains to manifolds for fuel cells.

DESCRIPTION OF THE RELATED ART

Fuel cells generate electricity based on an electrochemical reaction. There are various types of fuel cells that have been proposed or are in use. One type of fuel cell is known as a phosphoric acid fuel cell (PAFC). One of the problems associated with PAFCs are potential ground faults resulting from an electrical short caused by acid bridging from the fuel cell stack to the manifold. Such ground faults may result in an entire power plant shutdown, for example. While PAFCs typically include seals to prevent acid migration that may result in acid bridging, for example, such seals are not always entirely effective. If it were possible to prevent such acid bridging or to reduce the likelihood of a shutdown resulting from acid bridging, that would improve the reliability of PAFCs.

SUMMARY

An illustrative example fuel cell manifold includes a manifold structure having at least one surface situated where the surface may be exposed to phosphoric acid. The surface has a coating that reduces a possibility of an electrical short between the manifold and the fuel cell stack adjacent the manifold if that surface is exposed to phosphoric acid during fuel cell operation.

In an example embodiment of a fuel cell manifold having one or more features of the manifold of the previous paragraph, the coating comprises phosphate.

In an example embodiment of a fuel cell manifold having one or more features of the manifold of either of the previous paragraphs, the coating comprises a pre-cursor that yields a phosphate layer if the pre-cursor is contacted by phosphoric acid.

In an example embodiment of a fuel cell manifold having one or more features of the manifold of any of the previous paragraphs, the pre-cursor comprises iron oxide.

In an example embodiment of a fuel cell manifold having one or more features of the manifold of any of the previous paragraphs, the coating comprises a dielectric insulator.

An illustrative example fuel cell assembly includes a cell stack configured to generate electricity based on an electrochemical reaction. A manifold adjacent the cell stack includes at least one surface situated where the surface may be exposed to phosphoric acid. The surface has a coating that reduces the possibility of an electrical short between the manifold and the cell stack if that surface is exposed to phosphoric acid during fuel cell operation.

In an example embodiment having one or more features of the fuel cell assembly of the previous paragraph, the coating comprises phosphate.

In an example embodiment having one or more features of the fuel cell assembly of either of the previous paragraphs, the coating comprises a pre-cursor that yields a phosphate layer if the pre-cursor is contacted by phosphoric acid.

In an example embodiment having one or more features of the fuel cell assembly of any of the previous paragraphs, the pre-cursor comprises iron oxide.

In an example embodiment having one or more features of the fuel cell assembly of any of the previous paragraphs, the coating comprises a dielectric insulator.

An illustrative example method of operating a fuel cell assembly, which includes a cell stack and a manifold adjacent to the cell stack, includes providing a coating on at least one surface of the manifold. The surface is situated where the surface may be exposed to phosphoric acid. The coating reduces the possibility of an electrical short between the manifold and the cell stack if that surface is exposed to phosphoric acid during fuel cell operation.

In an example embodiment having one or more features of the method of the previous paragraph, the coating comprises phosphate.

In an example embodiment having one or more features of the method of either of the previous paragraphs, the coating comprises a pre-cursor that yields a phosphate layer if the pre-cursor is contacted by phosphoric acid.

In an example embodiment having one or more features of the method of any of the previous paragraphs, the pre-cursor comprises iron oxide.

In an example embodiment having one or more features of the method of any of the previous paragraphs, the coating comprises a dielectric insulator.

Various features and advantages of an example embodiment will become apparent to those skilled in the art from the following detailed description. The drawing that accompanies the detailed description can be briefly described as follows.

DETAILED DESCRIPTION

Figure 1:
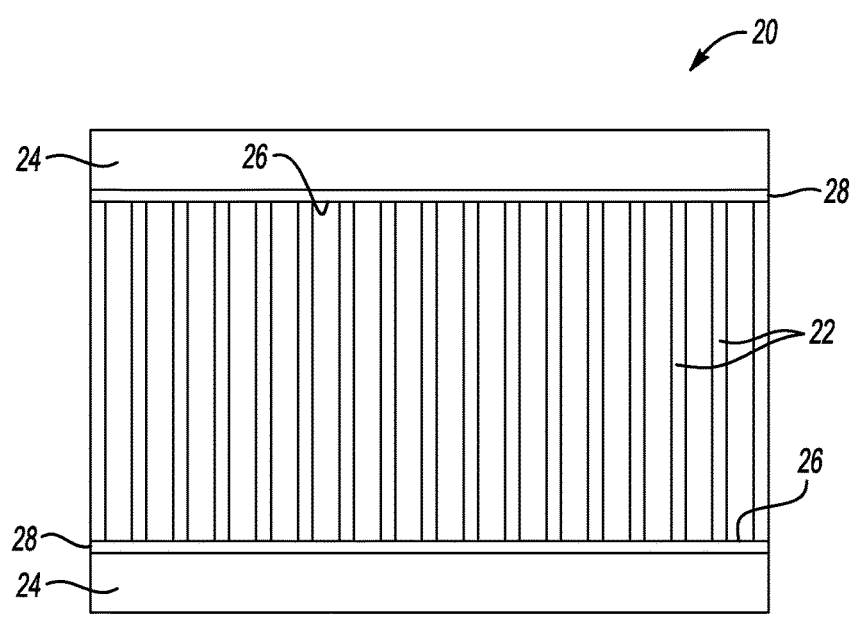
FIG. 1 schematically illustrates selected portions of a fuel cell assembly including a manifold designed according to an embodiment of this invention.

FIG. 1 schematically illustrates a fuel cell assembly 20. A cell stack assembly (CSA) 22 includes a plurality of cells that are configured to generate electricity based on an electrochemical reaction. The example fuel cell assembly 20 is a phosphoric acid fuel cell (PAFC). Accordingly, the example fuel cell assembly 20 includes liquid phosphoric acid as an electrolyte.

The fuel cell assembly 20 includes a manifold 24 that is configured to deliver reactant to the CSA 22, to carry away excess reactant or exhaust from the CSA 22, or both. The manifold 24 includes a manifold structure that may be configured in a known manner to achieve appropriate fluid flow to or from the CSA 22.

As schematically shown in FIG. 1, the manifold 24 includes at least one surface 26 that is situated where that surface 26 may be exposed to phosphoric acid during fuel cell operation. At least the surface 26 of the manifold 24 includes a coating schematically shown at 28 on at least a portion of the surface 26 that may be exposed to phosphoric acid during fuel cell operation. As known, fuel cells are designed to maintain phosphoric acid within desired portions of the fuel cell, but the possibility exists for some undesired contact between the phosphoric acid and portions of the fuel cell assembly 20.

The coating 28 on the surface 26 reduces or eliminates the possibility of an electrical short occurring because of acid bridging from the CSA 22 to the manifold 24. The coating in one embodiment comprises a phosphate. One example process of establishing a phosphate coating 28 includes exposing the surface 26 of the manifold 24 to a phosphoric acid solution that includes zinc or manganese with varying additional amounts of nitrates, chlorates and copper. A variety of known processes for coating metal parts using such a solution are known. One embodiment includes such a known process of establishing the coating 28. According to one embodiment, the coating occurs because of a reaction in a metal phosphate solution as follows

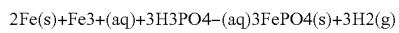

In another example, the coating 28 comprises a pre-cursor layer of the type that contact with phosphoric acid results in a self-healing phosphate layer on the surface 26. One example pre-cursor includes iron oxide, which is useful with a carbon steel manifold 24, for example.

The coating 28 comprises a dielectric insulator and is compatible with phosphoric acid such that the coating 28 eliminates or reduces instances of ground-fault otherwise caused by acid bridging between the CSA 22 and the manifold 24.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell stack, comprising:
a cell stack assembly including a plurality of fuel cells arranged in series;
a liquid phosphoric acid electrolyte in the cell stack;
a first manifold structure coupled to the cell stack assembly and having at least one surface situated adjacent the cell stack assembly where the at least one surface is exposed to the phosphoric acid electrolyte; and
a first coating on the at least one surface of the first manifold that reduces a possibility of an electrical short between the manifold and the cell stack assembly adjacent the first manifold, the first coating being a self-healing phosphate coating and the first coating in contact with the at least one surface and at least one fuel cell of the plurality of fuel cells of the cell stack assembly.

2. The fuel cell stack of claim 1 further comprising:
a second manifold structure coupled to the cell stack assembly and having at least one surface situated adjacent the cell stack assembly where the at least one surface is exposed to the phosphoric acid electrolyte, the at least one surface of the second manifold structure having a second coating that reduces a possibility of an electrical short between the second manifold structure and the cell stack assembly adjacent the second manifold structure, the second coating being a self-healing phosphate coating.

3. The fuel cell stack of claim 1, wherein one of the first and second coatings further comprises a dielectric insulator.

4. A fuel cell assembly, comprising:
a cell stack including a plurality of phosphoric acid fuel cells arranged in series, the cell stack having a first end and a second end;
a liquid phosphoric acid electrolyte in the cell stack;
a first manifold coupled to the cell stack and having a surface adjacent the first end of the cell stack;
a second manifold coupled to the cell stack assembly and having a surface adjacent the second end of the cell stack assembly;
a first coating layer on the surface of the first manifold, the first coating layer being a self-healing phosphate coating, the first coating layer being in contact with the surface of the first manifold and a surface of at least one phosphoric acid fuel cell of the plurality of phosphoric acid fuel cells of the cell stack; and
a second coating layer on the surface of the second manifold, the second coating layer including iron oxide.

5. The fuel cell assembly of claim 4 wherein the cell stack is configured to generate electricity based on an electrochemical reaction and the first and second coating layers reduce a possibility of an electrical short between the first manifold and the second manifold and the cell stack when the first coating layer and the second coating layer are exposed to phosphoric acid during fuel cell operation.

6. The fuel cell assembly of claim 4, wherein the first coating layer and the second coating layer cover the entire surface of the first manifold adjacent the first end of the cell stack and the surface of the second manifold adjacent the second end of the cell stack.

7. The fuel cell assembly of claim 4, wherein the second coating layer further comprises a dielectric insulator.

8. A method of forming a fuel cell assembly, the method comprising:
forming a cell stack assembly by arranging a plurality of fuel cells in series, the plurality of fuel cells including a liquid phosphoric acid electrolyte in the cell stack assembly;
coupling a first manifold to the cell stack assembly, the first manifold having a first surface in contact with the cell stack assembly;
coupling a second manifold to the cell stack assembly, the second manifold having a first surface in contact with the cell stack assembly, the first surface of the second manifold opposite the first surface of the first manifold;
forming a first coating on the first surface of the first manifold by forming a precursor layer of iron oxide and contacting the precursor layer with phosphoric acid; and
forming a second coating on the first surface of the second manifold, the second coating in contact with the first surface of the second manifold and an end surface of at least one of the plurality of fuel cells of the cell stack assembly, the forming of the second coating including forming a self-healing phosphate layer and contacting the self-healing phosphate layer with phosphoric acid.

9. The method of claim 8 wherein the first surface of the first manifold and the first surface of the second manifold are situated where the first surface of the first manifold and the first surface of the second manifold may be exposed to phosphoric acid, and wherein the first coating and the second coating reduce a possibility of an electrical short between the first manifold and the second manifold and the cell stack if the first surface of the first manifold and the first surface of the second manifold are exposed to phosphoric acid during fuel cell operation.

10. The method of claim 8 wherein the first coating and the second coating cover the entire first surfaces of the first manifold and the second manifold.

11. The method of claim 8, wherein one of the first coating and the second coating further include a dielectric insulator.

12. A fuel cell stacking, comprising:
a cell stack assembly including a plurality of phosphoric acid fuel cells arranged in series;
a first manifold adjacent the cell stack assembly and having a first surface in contact with the cell stack assembly; and
a first coating layer formed on the first surface of the first manifold, the first coating layer positioned between the first manifold and the cell stack assembly and contacting the first surface and a first end of each of the plurality of phosphoric acid fuel cells, the first coating laying being a self-healing phosphate layer formed from a precursor of iron oxide interacting with phosphoric acid.

13. The fuel cell stack of claim 12 further comprising:
a second manifold adjacent the cell stack assembly and having a first surface in contact with the cell stack assembly; and
a second coating layer on the first surface of the second manifold, the second coating layer positioned between the second manifold and the cell stack assembly and contacting the first surface and a second end of each of the plurality of phosphoric acid fuel cells, the second coating layer including one of phosphate and iron oxide.

14. The fuel cell stack of claim 13 wherein one of the first coating and the second coating layer include a dielectric insulator.

15. A method for forming a fuel cell stack, comprising:
forming a cell stack assembly by arranging a plurality of phosphoric acid fuel cells in an interconnected series;
coupling a first manifold to the cell stack assembly, the first manifold having a first surface; and
forming a first coating on the first surface of the first manifold, the first coating contacting the first surface of the first manifold and each of the plurality of phosphoric acid fuel cells, forming the first coating including forming a self-healing phosphate layer by contacting an iron oxide precursor layer with phosphoric acid.

16. The method of claim 15 further comprising:
coupling a second manifold to the cell stack assembly opposite the first manifold, the second manifold having a first surface; and
forming a second coating on the first surface of the second manifold, the second coating contacting the first surface of the second manifold and each of the plurality of phosphoric acid fuel cells, the second coating including one of phosphate and an iron oxide precursor.

17. A fuel cell stack, comprising: a cell stack assembly including a plurality of phosphoric acid fuel cells, the cell stack assembly producing electricity via an electrochemical reaction in the plurality of phosphoric acid fuel cells;
A liquid phosphoric acid electrolyte in the cell stack assembly;
a first manifold structure having at least one surface situated where the surface may be exposed to phosphoric acid, the at least one surface of the first manifold having a first coating that reduces a possibility of an electrical short between the first manifold and the cell stack assembly adjacent the manifold if the at least one surface is exposed to phosphoric acid during fuel cell operation, the first coating consisting of iron oxide and in contact with the at least one surface and at least one phosphoric acid fuel cell of the plurality of phosphoric acid fuel cells;
a second manifold having at least one surface situated where the surface may be exposed to phosphoric acid, the at least one surface of the second manifold having a second coating that reduces a possibility of an electrical short between the second manifold and the cell stack assembly adjacent the manifold if the at least one surface is exposed to phosphoric acid during fuel cell operation; and
wherein the second coating is a self-healing coating.

18. The fuel cell stack of claim 17 wherein the second coating includes one of iron oxide and phosphate.

19. The fuel cell stack of claim 1 further comprising:
a second manifold structure coupled to the cell stack assembly and having at least one surface situated adjacent the cell stack assembly where the at least one surface is exposed to the phosphoric acid electrolyte, the at least one surface of the second manifold structure having a second coating that reduces a possibility of an electrical short between the second manifold structure and the cell stack assembly adjacent the second manifold structure, the second coating including iron oxide.

* * * * *